(12) United States Patent
Joyce et al.

(10) Patent No.: US 8,998,307 B1
(45) Date of Patent: Apr. 7, 2015

(54) HEADER BEAM OF A VEHICLE FRAME AND METHOD OF FORMING THE SAME

(71) Applicant: Ford Global Technologies, LLC, Dearborn, MI (US)

(72) Inventors: John Joyce, Ypsilanti, MI (US); Jack Lashbrook, Garden City, MI (US); Duncan Whipps, Grosse Pointe Farms, MI (US); Christopher John May, Novi, MI (US); Darrin Neil Wagner, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/062,568

(22) Filed: Oct. 24, 2013

(51) Int. Cl.
*B62D 25/06* (2006.01)
*B62D 25/04* (2006.01)
*B62D 29/00* (2006.01)

(52) U.S. Cl.
CPC .............. *B62D 29/008* (2013.01); *B62D 25/06* (2013.01); *B62D 25/04* (2013.01)

(58) Field of Classification Search
CPC ................................. B62D 25/04; B62D 25/06
USPC .............................. 296/193.12, 201, 205, 210
See application file for complete search history.

(56) References Cited

U.S. PATENT DOCUMENTS

| | | | |
|---|---|---|---|
| 5,018,781 A * | 5/1991 | Kumasaka et al. | ........... 296/210 |
| 6,065,261 A | 5/2000 | Fehr et al. | |
| 6,116,680 A | 9/2000 | Hunter et al. | |
| 6,557,930 B1 | 5/2003 | Bruggemann et al. | |
| 6,584,689 B2 | 7/2003 | Bruggemann et al. | |
| 6,869,135 B2 | 3/2005 | Forssell | |
| 7,699,386 B2 | 4/2010 | Fukumoto | |
| 8,246,109 B2 | 8/2012 | Wykoff et al. | |
| 2013/0082484 A1* | 4/2013 | Wagner et al. | ................ 296/210 |

(Continued)

FOREIGN PATENT DOCUMENTS

| | | |
|---|---|---|
| DE | 10336901 B3 | 5/2005 |
| EP | 1759960 A2 | 3/2007 |

(Continued)

OTHER PUBLICATIONS

"Rugged Ridge Extruded Aluminum Windshield Header (2 & 4 Door JK 2007-2013)," printed May 24, 2013, http://www.fueled4wd.com/Rugged_Ridge_Windshield_Header_p/frr-13308.05.htm, 4 pages.

(Continued)

*Primary Examiner* — Jason S Morrow
(74) *Attorney, Agent, or Firm* — Jason Rogers; Price Heneveld, LLP

(57) ABSTRACT

A header beam couples between A-pillars of a vehicle frame. The header beam is formed from a generally straight beam segment that is extruded to have a hollow body portion with supportive legs extending within the hollow interior along the length of the beam segment, defining uninterrupted forward and rearward box sections for supporting continuous load paths on the header beam. The end portions of the beam segment are clamped and the beam segment is stretch bent to form a curvature between the end portions that remain generally straight. A front flange extends forward along the body portion and is struck proximate the end portions to form an edge that is parallel to the curvature formed between the end portions. The end portions are attached to the A-pillars and the edge of the front flange is attached to a windshield.

18 Claims, 7 Drawing Sheets

(56) References Cited

U.S. PATENT DOCUMENTS

| | | | |
|---|---|---|---|
| 2014/0008940 A1* | 1/2014 | Adamski | 296/210 |
| 2014/0138988 A1* | 5/2014 | Kisaku et al. | 296/210 |
| 2014/0217783 A1* | 8/2014 | Hida et al. | 296/210 |

FOREIGN PATENT DOCUMENTS

| | | |
|---|---|---|
| GB | 639911 | 7/1950 |
| JP | 2006240420 A | 9/2006 |
| JP | 2009113690 A | 5/2009 |
| JP | 2010013021 A | 1/2010 |
| JP | 2011136623 A | 7/2011 |
| JP | 2012081878 A | 4/2012 |

OTHER PUBLICATIONS

"National Code of Practice for Light Vehicle Construction and Modification," Vehicle Standards Bulletin 14, Section LH Body and Chassis, Jan. 2011, 73 pages, Version 2.0.

* cited by examiner

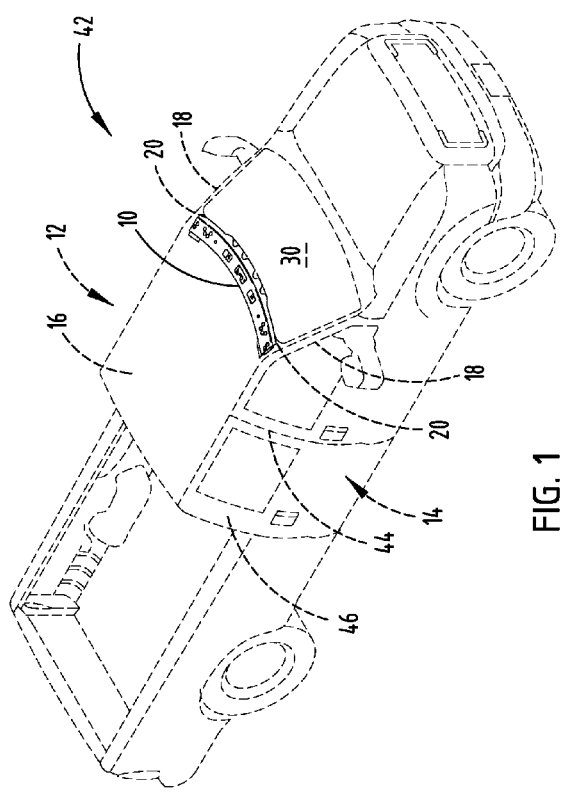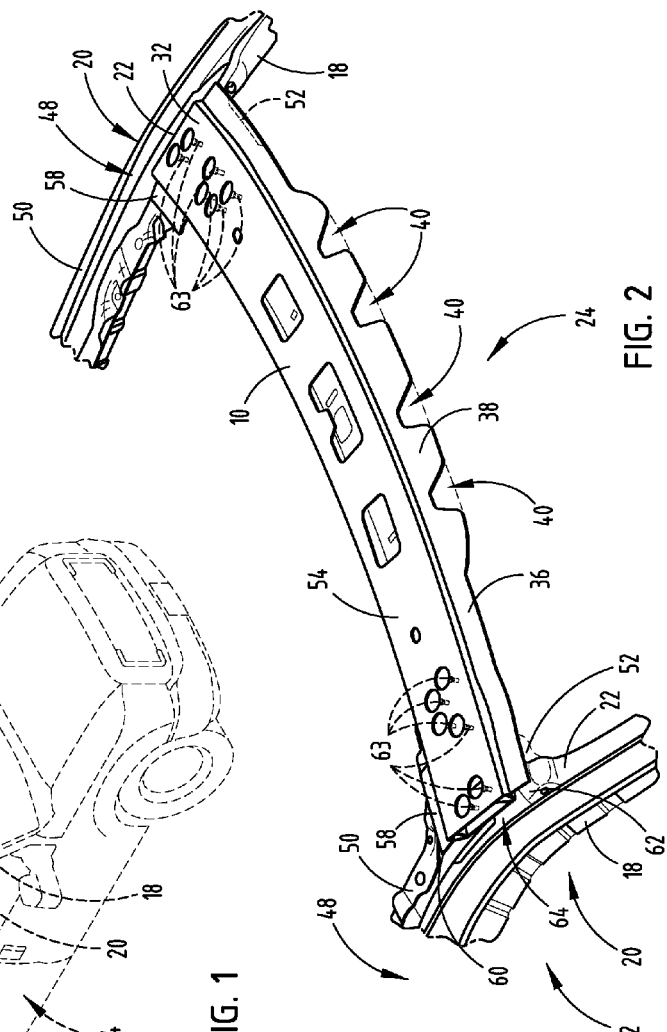
FIG. 1
FIG. 2

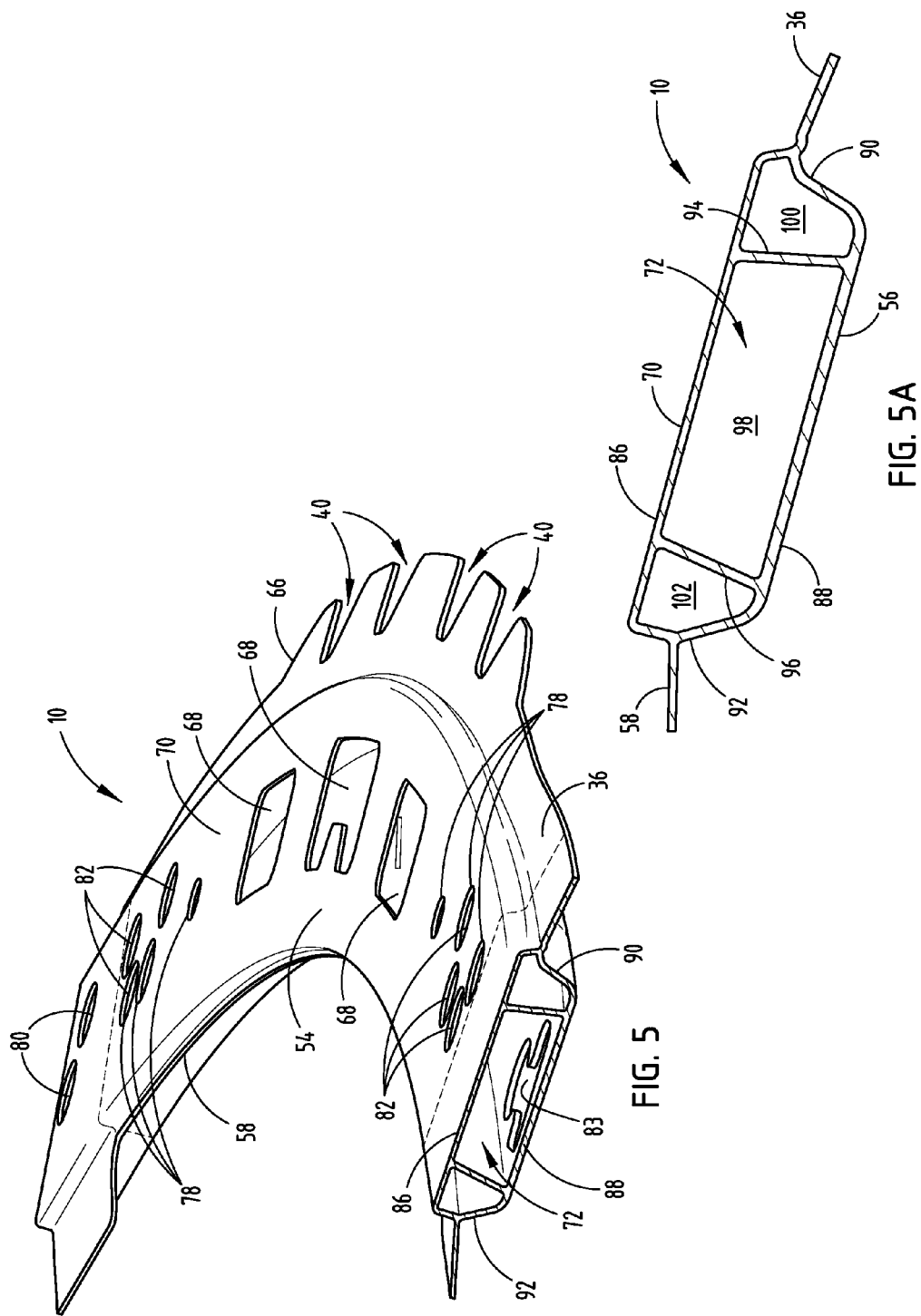

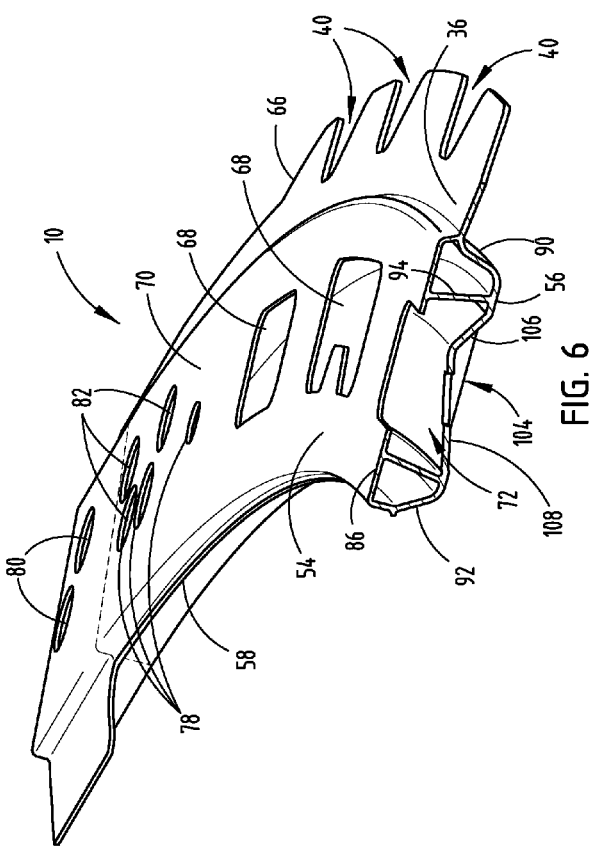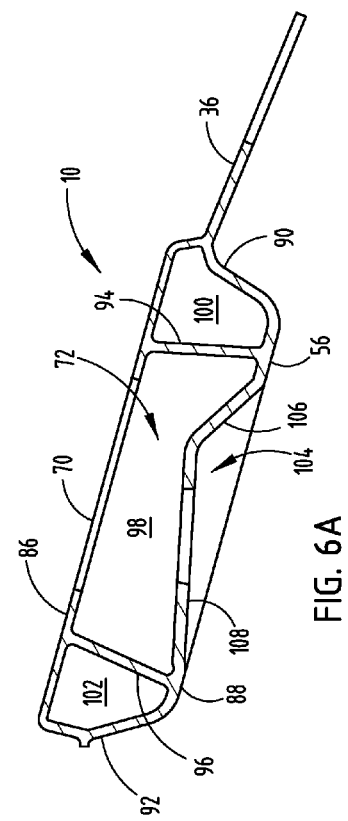

US 8,998,307 B1

HEADER BEAM OF A VEHICLE FRAME AND METHOD OF FORMING THE SAME

FIELD OF THE INVENTION

The present invention generally relates to a vehicle header beam, and more particularly relates to a hollow header beam that is formed from an elongated extruded beam.

BACKGROUND OF THE INVENTION

It is generally understood that vehicle frames include a header beam that spans between the A-pillars of the vehicle frame to support a vehicle roof and a windshield. To provide a consistent curvature across the header beam for attaching the windshield, steal header beams are typically formed with a stamping process that may cause a significant amount of scrap material to be generated. Also, it is common for header beams have multiple attachment features along the length of the header beam that can have a tendency to reduce the structural integrity of the beams, making the use of lightweight extruded metal on header beams more difficult. As it becomes more desirable for vehicles to be built with lighter materials that also adhere to higher safety standards, it is increasingly desirable to utilize components made with extruded metal and with fewer structural discontinuities, while maintaining or reducing cost of the components.

SUMMARY OF THE INVENTION

According to one aspect of the present invention, an extruded vehicle header beam includes an elongated member having a hollow interior extending a length of the beam between opposing ends thereof. Front and rear legs extend continuously within the hollow interior between the opposing ends. A central area is defined between the front and rear legs and has engagement apertures spaced along the length. The front and rear legs define uninterrupted box sections outside the central area.

According to another aspect of the present invention, an extruded header beam for a vehicle frame includes an elongated member having a hollow interior extending between opposing ends thereof. Front and rear legs extend continuously within the hollow interior between the opposing ends. A central area between the front and rear legs has apertures for coupling the vehicle frame. Forward and rearward uninterrupted box sections extend outside the central area and are defined by the elongated member and the front and rear legs, respectively.

According to yet another aspect of the present invention, a vehicle frame includes A-pillars and an extruded header beam spanning between the A-pillars. The extruded header beam includes an elongated member having top, bottom, front, and rear walls that define a hollow interior extending between opposing ends of the header beam. Front and rear legs extend between the top and bottom walls continuously within the hollow interior to define forward and rearward box sections. Fasteners extend through the bottom wall between the front and rear legs and attach to the opposing ends to the A-pillars. The forward and rearward box sections carry continuous load paths between the A-pillars.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top perspective view of a vehicle having a header beam, according to one embodiment of the present invention;

FIG. 2 is a top perspective view of the header beam attached to and spanning between a corresponding pair of A-pillars, according to one embodiment;

FIG. 5 is a top perspective end view showing a hollow interior of the header beam;

FIG. 5A is an end view of the header beam, as shown in FIG. 5;

FIG. 6 is a top perspective cross-sectional view of the header beam showing the hollow interior proximate a central portion of the header beam;

FIG. 6A is a cross-sectional end view of the header beam, as shown in FIG. 6;

DETAILED DESCRIPTION OF THE PREFERRED EMBODIMENTS

Figure 3:
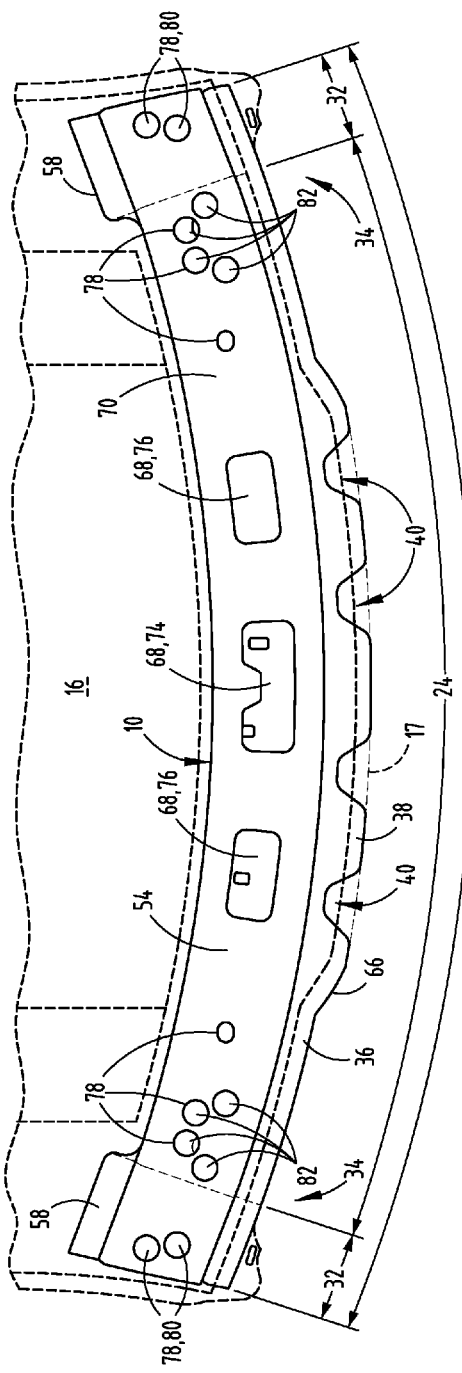
FIG. 3 is a top plan view of the header beam showing portions of one embodiment of a roof panel covering the header beam.

For purposes of description herein, the terms "upper," "lower," "right," "left," "rear," "front," "vertical," "horizontal," and derivatives thereof shall relate to the invention as illustrated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-9, reference numeral 10 generally designates a header beam for a frame 12 of a vehicle body 14. The vehicle body 14 includes a roof panel 16 and a pair of A-pillars 18 that each have a top end 20 with an upper surface 22. The hollow header beam 10 includes a curved central portion 24 of a length 26 of the header beam 10 that has a curvature 28 protruding forward to conform to a windshield 30. End portions 32 of the length 26 of the header beam 10 proximate opposing ends 34 of the central portion 24 couple with the upper surface 22 of the pair of A-pillars 18 and have a generally straight orientation relative to the curvature 28 of the central portion 24. A front flange 36 extends forward along the length 26 of the header beam 10 and has an edge parallel to the curvature 28 proximate the end portions 32 for engaging the windshield 30. The front flange 36 also has a center region 38 protruding forward that includes a series of notches 40 spaced along the center region 38 for coupling with the roof panel 16.

Referring now to FIG. 1, a vehicle 42 is shown having one embodiment of the header beam 10 of the present invention. As generally understood in the art, the frame 12 of the vehicle 42 includes a series of pillars that extend upward around an interior cabin of the vehicle 42 to support the roof panel 16 or portions thereof. The pillars, in the illustrated embodiment, include the A-pillars 18, B-pillars 44, and C-pillars 46. However, it is conceivable that the vehicle 42 may be another embodiment or type of vehicle, such as a car or van, that may include more or fewer pillars to vertically support the roof panel 16 or header beam 10 or to otherwise border the interior cabin of the vehicle 42. Further, it is contemplated that the roof panel 16 and the header beam 10 may be alternatively configured with a moon roof assembly, a convertible top assembly, or other alternative roof configuration, as generally understood by one having ordinary skill in the art.

As illustrated in FIG. 2, the A-pillars 18 each couple with and vertically support a front end 48 of a longitudinal roof rail 50 that extends rearward from the header beam 10 to support the lateral sides of the roof panel 16 and any additional cross members that may span laterally across the vehicle 42 in generally parallel alignment with the header beam 10. The longitudinal roof rails 50 integrally couple with the top ends 20 of the A-pillars 18 to form an angled connection, whereby the A-pillars 18 extend down and forward at an angled design of the windshield 30 (FIG. 1). The header beam 10 generally spans between the angled connections between the A-pillars 18 and the longitudinal roof rails 50. It is contemplated that the A-pillars 18 and the longitudinal roof rails 50 may be an integral piece along with other pillars or cross members of the vehicle frame 12 or may be individual parts that are attached directly together or separated by other structural members. Furthermore, it is understood that in the illustrated embodiment the A-pillars 18 and longitudinal roof rails 50, along with other parts of the vehicle 42 that have corresponding parts on opposing lateral sides of the vehicle 42, are substantially mirror images of each other, such that illustration and description of one may be inferred to the other, unless specified to the contrary.

With further reference to FIG. 2, the top ends 20 of the A-pillars 18 have inward protruding attachment members 52 that define the upper surface 22 of the A-pillars 18 for coupling with the header beam 10. The attachment members 52 are configured to have a shape that conforms to the end portions 32 of the header beam 10 for attachment therewith. More specifically, the header beam 10 has a hollow body portion 54 with a rear flange 58 and the front flange 36 on opposing sides of the body portion 54 proximate the end portions 32 of the header beam 10 that couple with raised areas of the attachment member 52. Accordingly, a cavity 64 on the attachment members 52 couples with a bottom surface 56 of the body portion 54 of the header beam 10 and a raised upper portion 60 and a raised lower portion 62 on opposing sides of the cavity 64 engage the rear flange 58 and the front flange 36 of the header beam 10, respectively.

As also shown in FIG. 2, the connection between the attachment members 52 and the header beam 10 is done by a series of self-tapping rivets 63 that extend though the body portion 54 of the header beam 10 proximate the end portions 32 and attach within the cavity 64 of the attachment member 52. In other embodiments, it is contemplated that the connection between the attachment members 52 and the header beam 10 may be done by additional or alternative means, including welding, fastening, and other generally appreciated means of attachment by one having ordinary skill in the art. It is also contemplated that the attachment members 52 may be separate components from the A-pillars 18 that are attached to either the header beam 10 or the A-pillars 18 before the header beam 10 is attached to the A-pillars 18. The attachment members 52 in other conceivable embodiments may also protrude inward more or less than the illustrated embodiment or be entirely encompassed within the width of the A-pillars 18.

As illustrated in FIG. 3, the central portion 24 of the header beam 10 spans between the end portions 32 that attach to the A-pillars 18 (FIG. 2) and sweeps forward in the curvature 28 (FIG. 4) corresponding to the curvature of the windshield 30 (FIG. 1). The roof panel 16 attaches to the header beam 10 and conforms to a front edge 66 (FIG. 4) of the header beam 10. The front flange 36 of the header beam 10 protrudes generally horizontally from the body portion 54 and extends along the length 26 of the header beam 10. The front flange 36 is formed to protrude proximate the center region 38, defining a tongue portion that protrudes forward a greater distance than the front flange 36 proximate the end portions 32. Accordingly, the center region 38 of the front flange 36 has a depth that accommodates the series of notches 40 along the front edge 66 to provide points of attachment between a forward edge 17 of the roof panel 16 and the front edge 66 of the header beam 10. The front edge 66 of the front flange 36 is also formed proximate the end portions 32 to be parallel to the curvature 28 of the body portion 54 of the header beam 10 proximate the central portion 24. Accordingly, the front flange 36 proximate the end portions 32 is adapted to couple with the curvature of the windshield 30 (FIG. 1). It is contemplated that the tongue portion may be omitted or alternatively shaped, such that the front edge 66 may be parallel to the curvature 28 (FIG. 4) of the body portion 54 proximate the center region 38 and thereby provide a consistent curvature of the front edge 66 along the length 26 of the header beam 10.

Also, as shown in FIG. 3, a number of openings 68 are formed on a top surface 70 of the body portion 54, proximate the center region 38 of the front flange 36, that extend into a hollow interior 72 (FIG. 5) of the header beam 10. The openings 68 facilitate access to hollow interior 72 for providing support to the bottom wall 88 when deforming to the bottom wall 88 to stamp or otherwise create the inward depressions 104, as explained in more detail below. Specifically, the openings 68 include a center opening 74 having a generally rectangular shape and a rear protrusion extending forward into the rectangular shape at approximately a midpoint of the header beam 10. The rear protrusion may be used to attach a portion of the roof structure and thereby support the roof panel 16. The openings 68 also include a pair of lateral openings 76 that are positioned at equally spaced locations on opposing sides of the center opening 74 and similarly include a generally rectangular shape. Several access and attachment apertures 78 are also formed through the top surface 70 proximate the end portions 32 of the header beam 10. These apertures 78 include two distal apertures 80 on each end portion 32 and a grouping of four circular apertures 82 slightly inward from the two distal apertures 80 and the end portions 32 of the header beam 10. These apertures 78 are used for inserting and connecting the self-tapping rivets 63 (FIG. 2), or other conceivable fasteners, through the header beam 10 and into the attachment members 52 on the A-pillars 18. However, it is also contemplated that they may be used to attach portions of the roof panel 16 or to insert welding instruments for forming welds between the header beam 10 and the A-pillars 18.

Figure 4:
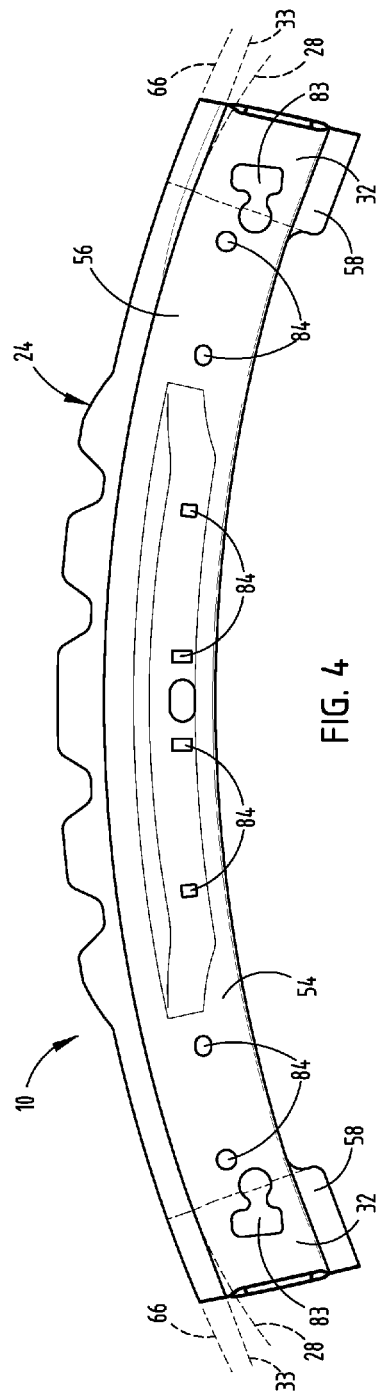
FIG. 4 is a bottom plan view of the header beam.

Referring now to FIG. 4, the header beam 10 is shown having interior connection apertures 83 formed through the bottom surface 56 of the body portion 54 proximate the end portions 32 of the header beam 10. The interior connection apertures 83 include an outer rectangular portion and an inner circular portion that combine to form the shape of the interior connection apertures 83. The connection apertures are each used for attaching a sun visor assembly to the header beam 10 and may also be used to interface and align the header beam 10 with the attachment members 52. A number of small locating and clearance holes 84 are also formed, such as by milling or drilling, through the bottom surface 56 of the body portion 54. The locating and clearance holes 84 are spaced in a generally symmetrical arrangement along the length 26 (FIG. 3) of the header beam 10 between the interior connection apertures 83 for aligning and positioning the header beam 10 on the vehicle 42 (FIG. 1). It is contemplated that the holes 84 may be used for connection with interior trim pieces or other vehicle components. It is also understood that the size and shape of the holes, apertures, and openings on the top and bottom surfaces 70, 56 may be altered in additional embodiments to accommodate various potential attachment points between the header beam 10 and the roof panel 16, A-pillars 18, and other conceivable vehicle components.

As also illustrated in FIG. 4, the curvature 28 of the central portion 24 of the header beam 10 is accentuated by dashed lines shown extending beyond the central portion 24 to intersect with the end portions 32, thereby illustrating the discontinuous shape along the overall length 26 of the header beam 10. Similarly, the generally straight orientation 33 of the body portion 54 of the end portions 32 is shown with dashed lines extending beyond the length 26 of the header beam 10 to similarly illustrate the divergence from the curvature 28 of the central portion 24 of the header beam 10. Further, the front edge 66 of the front flange 36 is shown extending beyond the length 26 of the header beam 10 in parallel alignment with the curvature 28 of the central portion 24, thereby diverging from the straight orientation 33 of the body portion 54 of the end portions 32. In the illustrated embodiment, the curvature 28 of the central portion 24 is a substantially continuous arc along a circumference, although it is understood that the curvature 28 in additional embodiments may not be consistent along the central portion 24, such as being more exaggerated near the end portions 32 and straighter in the center or more or less exaggerated at other various locations along the central portion 24. However, the end portions 32 will remain substantially straight in orientation.

The body portion 54 of the header beam 10, as shown in FIGS. 5-5A, is hollow, and thereby bordered by a top wall 86, a bottom wall 88, a front wall 90, and a rear wall 92 to form the hollow interior 72. The front flange 36 extends forward from a midregion of the front wall 90, and similarly, the rear flange 58 extends rearward from a midregion of the rear wall 92. A forward leg 94 and a rearward leg 96 extend linearly between the top wall 86 to the bottom wall 88 and span continuously within the hollow interior 72 along the length 26 of the header beam 10. The forward and rearward legs 94, 96, also referred to as interior walls, are formed at outward angles between the top and bottom walls 86, 88 to decrease the amount of unsupported portions of the top wall 86 during bending of the header beam 10, and to increase the available bottom surface 56 of the header beam 10 for joining and attaching other attachment components. As such, in the illustrated embodiment, the forward and rearward legs 94, 96 angle away from each other as they extend downward from the top wall 86 to the bottom wall 88, attaching to the bottom wall 88 near the front and rear walls 90, 92, respectively. The hollow interior 72 is thereby divided by the forward and rearward legs 94, 96 into a central area 98, a forward area 100, and a rearward area 102, whereby the forward and rearward areas 100, 102 have similar sizes and define uninterrupted box sections that are void of attachment apertures or other interruptions. It is understood that in additional embodiments more or fewer legs may be formed to vertically extend within the hollow interior 72 to alternatively support the top wall 86 away from the bottom wall 88.

As illustrated in FIGS. 6-6A, the central area 98 of the hollow interior 72 has an inward depression 104 that protrudes into the central area 98 and provides an inset surface on the bottom surface 56 for mating components of the vehicle 42 (FIG. 1) that may require an alternative angle of attachment from the surrounding portions of the bottom surface 56. The inward depression 104 includes a first surface 106 that is angled inward proximate the forward leg 94 and a second surface 108 that is angled inward proximate the rearward leg 96. The first and second surfaces 106, 108 of the inward depression 104 are generally planar and meet at an angle that is furthest into the hollow interior 72. In the illustrated embodiment, the inward depression 104 and corresponding inset surface extend continuously along a section of the central portion 24 (FIG. 4) of the header beam 10. However, it is understood that the inward depression 104 may be segmented at various points along the header beam 10, have an alternative shape, or may otherwise not be included if mating components of the vehicle 42 (FIG. 1) do not require a surface with an alternative angle of attachment.

Figure 7:
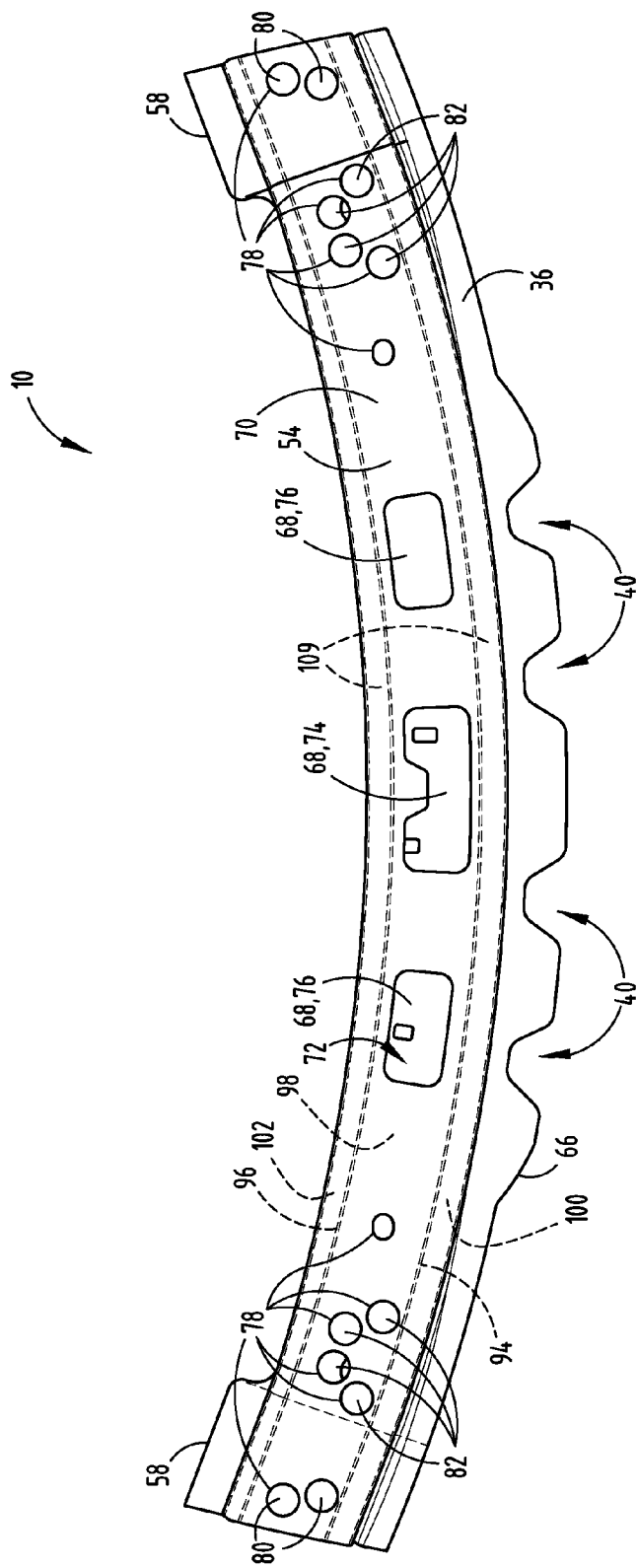
FIG. 7 is a top plan view of the header beam showing a forward leg and a rearward leg, in dashed lines, extending within the hollow interior along the length of the header beam.

As further shown in FIG. 7, the forward and rearward legs 94, 96 extend continuously within the hollow interior 72 along the length 26 of the header beam 10. The corresponding forward and rearward areas 100, 102 of the hollow interior 72, accordingly, extend along the length 26 of the header beam 10 to define continuous and uninterrupted box sections 109 that have a tubular shape and extend along the front and rear edges of the body portion 54. The uninterrupted box sections 109 do not contain any holes, apertures, or other discontinuities along the length 26 of the header beam 10 to provide continuous load paths along the length 26 of the header beam 10 and to provide consistent structural support between the A-pillars 18 and along the front of the roof panel 16. The uninterrupted box sections 109 are thereby designed to absorb impact forces and to carry loads placed on the header beam 10 from normal operating conditions of the vehicle 42. The central area 98 between the uninterrupted box sections 109 secures the uninterrupted box sections 109 to each other to prevent splaying or torsion between the uninterrupted box sections 109. Also, due to the uninterrupted box sections 109 carrying the primary loads on the header beam 10, the apertures 78, holes 68, 84, (FIG. 4) and other features formed on the top and bottom walls 86, 88 do not structurally compromise the header beam 10.

Figure 8:
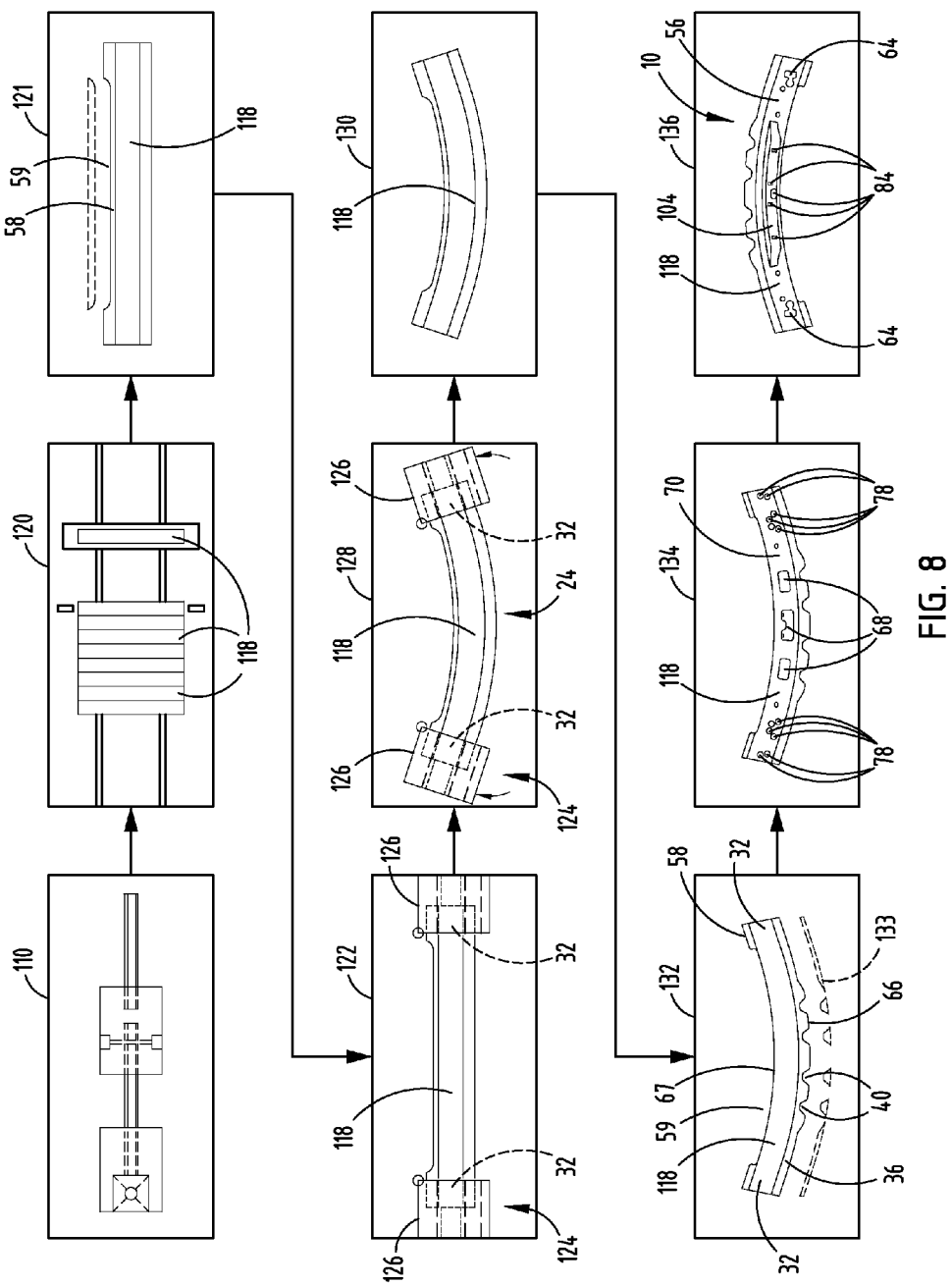
FIG. 8 is a flowchart showing a method of forming the header beam along with illustrations of the header beam at each step of the method, according one embodiment of the present invention.

Referring now to FIG. 8, a flowchart illustrates one embodiment of the method of forming the header beam 10. At step 110, a continuous beam 112 is extruded from an extrusion die 114 to have the hollow interior 72 (FIG. 5) with the forward and rearward legs 94, 96 (FIG. 5A) extending continuously within the hollow interior 72 to define the central, forward, and rearward areas 98, 100, 102 (FIG. 5A). The continuous beam 112 is cut at a cutting station 116 to form a beam segment 118 with ends generally perpendicular to the length 26 of the beam segment 118. The beam segments 118 are then accumulated in stacks for transportation. The continuous beam 112 and, therefore, the resultant header beam 10 of the illustrated embodiment is extruded primarily from aluminum, although it is understood that additional and alternative materials may be used to form the header beam 10. It is also contemplated that the header beam 10 or portions thereof may be formed from alternative metals and may be alternatively roll formed, hydroformed, or alternatively joined, such as by laser or arc welding.

The beam segments 118, as shown at step 120 of FIG. 8, are unstacked, measured, and centered on a conveyor. The conveyor feeds the beam segments to a trimming station 121 where the rear flange 58 that extends continuously along the length of the beam segment 118 is trimmed. More specifically, the rear flange 58 is cut to form an elongated cutout 59 that defines rearward projections of the rear flange 58 proximate the end portions 32. It is contemplated that the rear flange 58 may be alternatively struck or otherwise cut to remove the elongated piece of the rear flange 58 that forms the elongated cutout 59.

As also shown in FIG. 8, at step 122, the end portions 32 of the beam segment 118 are clamped with a bending device 124 that securely attaches to the end portions 32 of the beam segment 118. The bending device 124 in the illustrated embodiment has two clamping units 126 that clamp the end portions 32 equally to center the beam segment 118 between the two clamping units 126. At step 128, the bending device 124 moves the clamping units 126 in generally opposite directions to stretch bend the central portion 24 the beam segment 118 in a shaped that conforms to the generally consistent curvature 28 across the central portion 24 of the beam segment 118. More specifically, the bending device 124 stretch bends the beam segment 118 in three dimensions, such that the rear flange 58 and the rear wall 92 and the bottom wall 88 (FIG. 5A) of the body portion 54 undergo some compression in the stretch bending process. However, the elongated cutout 59 in the rear flange 58 significantly reduces compression in the rear flange 58 to prevent buckling or undesirable curvature during the stretch bending process. It is understood that in additional embodiments, the bending device 124 may have one clamping unit 126 that moves relative to a stationary clamping unit 126 to stretch and bend the beam segment 118 to the curvature 28. The clamping units 126 are released from the beam segment 118 in step 130, and the end portions of the beam segment remain generally straight, as previously described.

Still referring to FIG. 8, at step 132, a press with a cutting die 133 strikes the front flange 36 of the beam segment 118 with a pattern that provides generally uniform front edges 66 of the front flanges 36 across production of multiple beam segments 118. More specifically, the front flange 36 is struck to form the front edge 66 that is parallel to the curvature 28 proximate the end portions 32 of the beam for engaging the windshield 30. The cutting die 133 also forms the series of notches 40 on the center region 38 of the front flange 36 to reduce tension in the front flange 36 caused by the stretch bending process and to provide points of connection for the forward edge 17 of the roof panel 16. The notches 40 interface with the roof panel 16 to also provide an area to relieve fluid buildup between the front flange 36 and the roof panel 16 (FIG. 3), such as during the painting process of the vehicle body. Further, cutting the notches 40 in the front flange 36 also provides a weight savings in the center region 38 of front flange 36, which increases the load bearing capacity of the header beam 10 and reduces the overall weight of the header beam 10.

At steps 134 and 136, as shown in FIG. 8, the top and bottom surfaces 70, 56 of the body portion 54 of the beam segment 118 are machined and hydroformed to create the apertures 78, openings 68, the inward depression 104, and other features on the body portion 54, as previously described. In additional embodiments, several of the steps, including steps 134 and 136, may be done simultaneously, in additional separate steps, or may be done in any combination of steps. Furthermore, the machining and hydroforming may be replaced entirely or partially for forming any one of the features with alternative forming means, such as drilling, stamping, various forms of cutting, or other forming means as generally understood by one having ordinary skill in the art.

Figure 9:
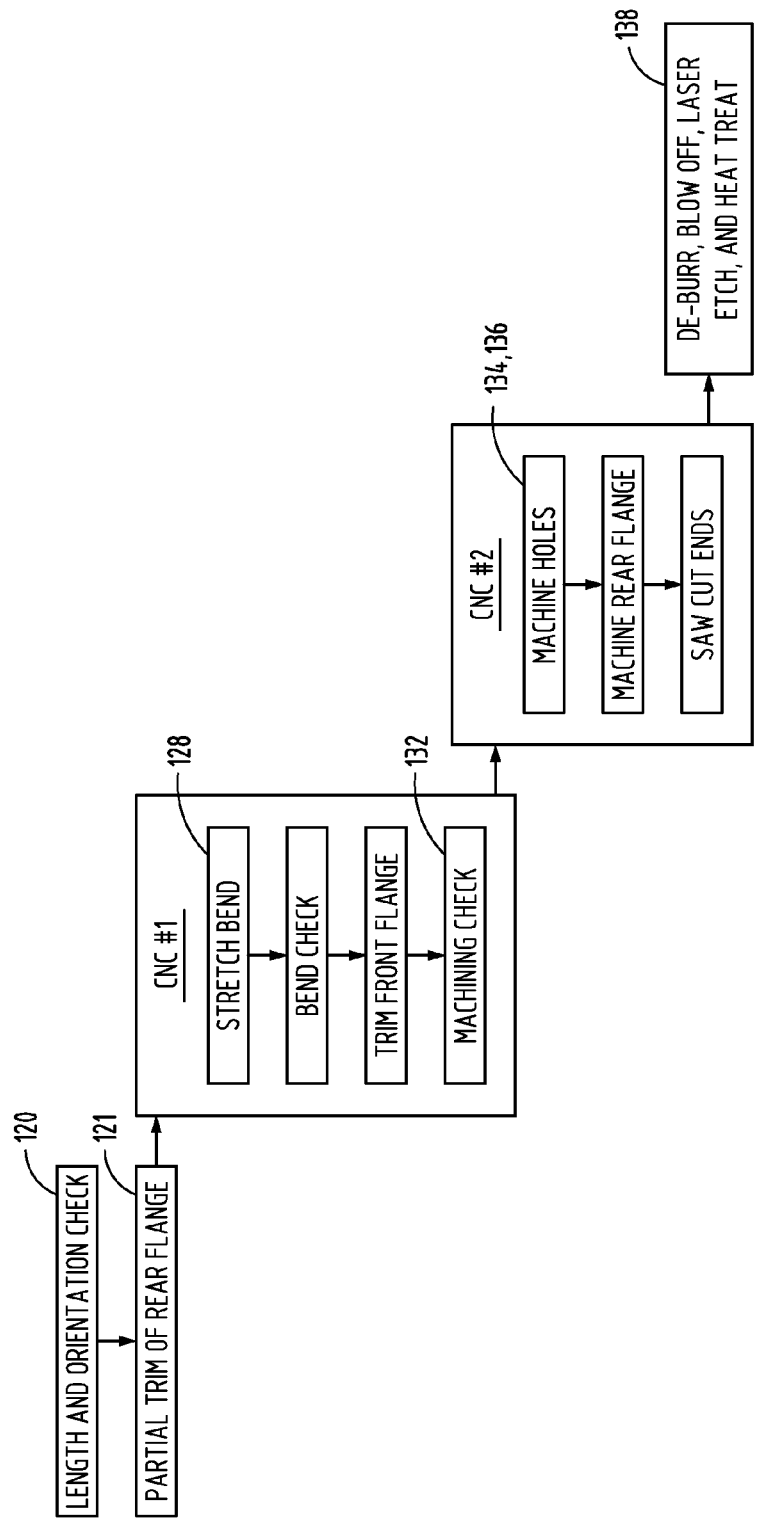
FIG. 9 is a flowchart showing a method of forming the header beam, according an additional embodiment of the present invention.

An additional flowchart is shown in FIG. 9, illustrating another embodiment of the method of forming the header beam 10 having several of the steps shown in FIG. 8. As shown, in the illustrated embodiment a single CNC machine performs steps 128 and 132 along with performing a check for the appropriate bend to the curvature 28 and a check for the appropriately oriented front flange 36 proximate the end portions 32 and the center region 38. Upon checking the machining of the front flange 36, a second CNC machine performs steps 134 and 136 in addition to touching up the elongated cutout 59 in the rear flange 58 and cutting the ends to make the front flange 36 and the machined holes symmetrical about the midpoint of the header beam 10 and any other refining to put the header beam 10 within the manufacturing tolerances. A last step 138 of the illustrated embodiment includes the finishing of the header beam 10, including de-burring, blowing off any debris on the header beam 10, laser etching an identification number and/or code, and heat treating the header beam 10. It is contemplated that the header beam 10 may be treated with heat or other means of altering the hardness of the beam at any point of the forming processes, as generally understood by one having ordinary skill in the art. Further, upon forming the beam segment 118 into the header beam 10, the end portions 32 of the beam segment 118 are attached to the A-pillars 18 of the vehicle 42 (FIG. 2), the roof panel 16 is attached to the series of notches 40 and other attachment features on the front edge 66 or other portions of the header beam 10 (FIG. 3), and the windshield 30 is attached to the front edge 66 (FIG. 1), as generally shown and described above.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. An extruded vehicle header beam comprising:
    an elongated member having a hollow interior extending a length of the beam between opposing ends thereof;
    front and rear legs extending continuously within the hollow interior between the opposing ends;
    a central area between the front and rear legs having engagement apertures spaced along the length, wherein the front and rear legs define uninterrupted box sections outside the central area; and
    a rear flange extending rearward from the elongated member along the length and having an elongated cutout centered on the elongated member to define rearward projecting members proximate the end portions.

2. The extruded vehicle header beam of claim 1, wherein the uninterrupted box sections carry continuous load paths outside the central area.

3. The extruded vehicle header beam of claim 2, further comprising:
    a front flange extending forward from the elongated member along the length and having an edge proximate the opposing ends that is parallel to a curvature of the elongated member.

4. The extruded vehicle header beam of claim 3, wherein the curvature of the elongated member spans between end portions of the elongated member that are generally straight relative to the curvature, and wherein the curvature is configured to engage a vehicle windshield.

5. The extruded vehicle header beam of claim 1, wherein the elongated member includes a top wall and a bottom wall extending the length, and wherein the front and rear legs extend between the top and bottom walls to surround the central area.

6. The extruded vehicle header beam of claim 5, wherein the bottom wall includes the engagement apertures proximate the opposing ends to engage opposing vehicle A-pillars.

7. The extruded vehicle header beam of claim 5, wherein the front and rear legs angle away from each other, such that the front and rear legs proximate the bottom wall are spaced a greater distance than proximate the top wall.

8. An extruded header beam for a vehicle frame, comprising:
    an elongated member having a hollow interior extending between opposing ends thereof;
    front and rear legs extending continuously within the hollow interior between the opposing ends, defining a central area between the front and rear legs having apertures and forward and rearward box sections outside the central area; and
    a flange extending rearward from the elongated member and having rearward projections proximate the opposing ends.

9. The extruded header beam of claim 8, wherein the forward and rearward box sections carry continuous load paths outside the central area between the opposing ends of the elongated member.

10. The extruded header beam of claim 8, further comprising:
    fasteners that extend though the apertures in the central area and engage opposing A-pillars of the vehicle frame, and wherein the forward and rearward box sections each carry a continuous load path between the opposing A-pillars.

11. The extruded header beam of claim 8, wherein the elongated member includes a top wall, a bottom wall, a front wall, and a rear wall that together surround the hollow interior.

12. The extruded header beam of claim 11, wherein the front and rear legs extend down from the top wall at spaced locations away from the front and rear walls, and wherein the front and rear legs angle away from each other as they extend down from the top wall to the bottom wall.

13. The extruded header beam of claim 12, wherein the front wall and the front leg define vertical boundaries of the forward box section, and wherein the engagement apertures extend through the bottom wall proximate the central area to couple with opposing A-pillars of the vehicle frame.

14. The extruded header beam of claim 13, further comprising:
    a front flange extending forward from the front wall and spanning between the opposing ends of the elongated member, wherein the front flange includes an edge proximate the opposing ends that is parallel to a curvature of the elongated member.

15. The extruded header beam of claim 14, further comprising:
    a rear flange extending rearward from the rear wall proximate the opposing ends, wherein the front and rear flanges couple with the opposing A-pillars.

16. The extruded header beam of claim 14, wherein the front flange includes a valley adjacent to the front wall proximate the opposing ends to provide the curvature formed consistently between the opposing ends.

17. A vehicle frame comprising:
    A-pillars;
    an extruded header beam spanning between the A-pillars and comprising:
        an elongated member having top, bottom, front, and rear walls that define a hollow interior extending between opposing ends of the header beam; and
        front and rear legs extending between the top and bottom walls continuously within the hollow interior to define forward and rearward box sections, wherein the bottom wall includes a depression proximate a central region of the elongated member and a series of holes through the bottom wall between the front and rear legs; and fasteners extending through the bottom wall between the front and rear legs and attaching the opposing ends to the A-pillars, wherein the forward and rearward box sections carrying continuous load paths between the A-pillars.

18. The vehicle frame of claim 17, further comprising:
a front flange extending forward from the front wall and spanning between the opposing ends of the elongated member, wherein the front flange includes an edge proximate the opposing ends that is parallel to a curvature of the elongated member.

* * * * *